(No Model.) 3 Sheets—Sheet 1.

J. W. WINGET.
CATTLE GUARD.

No. 563,634. Patented July 7, 1896.

WITNESSES
G. M. Anderson
Phil C. Mosi

INVENTOR
J. W. Winget
by E. W. Anderson
his Attorney (No Model.) 3 Sheets—Sheet 2.
J. W. WINGET.
CATTLE GUARD.
No. 563,634. Patented July 7, 1896.
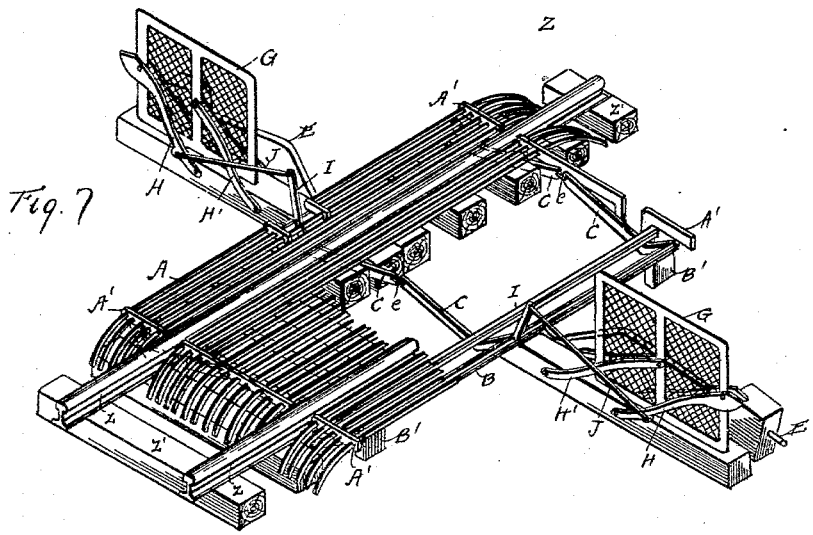
Fig. 7
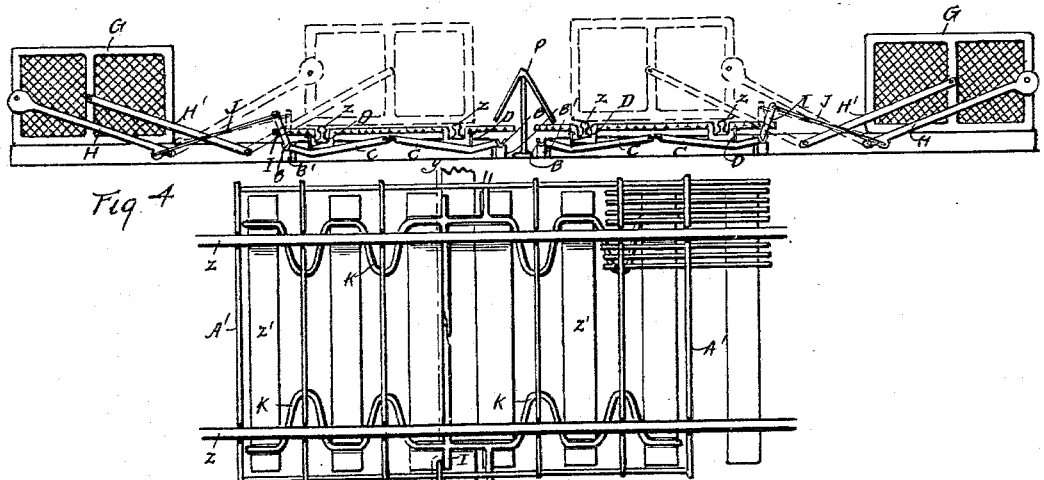
Fig. 6.
Fig. 4
WITNESSES
G. M. Anderson
Phil C. Masi
INVENTOR
J. W. Winget
by E. W. Anderson
his Attorney (No Model.) 3 Sheets—Sheet 3.

J. W. WINGET.
CATTLE GUARD.

No. 563,634. Patented July 7, 1896.

Witnesses.
G. M. Anderson
Phil C. Masi

Inventor.
J. W. Winget
by E. W. Anderson,
his Attorney.

UNITED STATES PATENT OFFICE.

JOSHUA WALTER WINGET, OF HUNTINGTON, WEST VIRGINIA.

CATTLE-GUARD.

SPECIFICATION forming part of Letters Patent No. 563,634, dated July 7, 1896.

Application filed February 7, 1896. Serial No. 578,403. (No model.)

*To all whom it may concern:*

Be it known that I, JOSHUA WALTER WINGET, a citizen of the United States, and a resident of Huntington, in the county of Cabell and State of West Virginia, have invented certain new and useful Improvements in Cattle-Guards; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
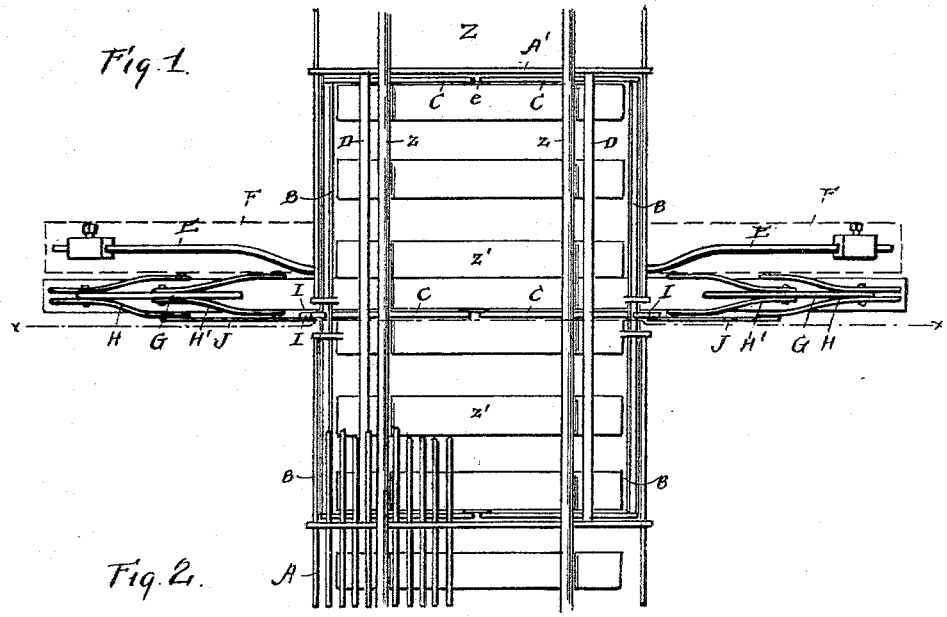
Figure 2:
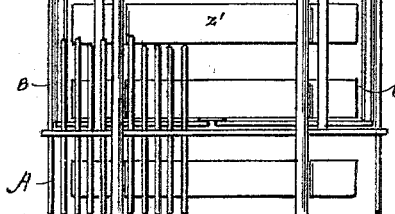
Figure 3:
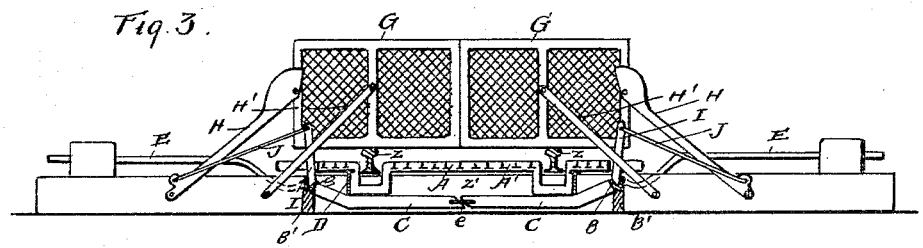
Figure 5:
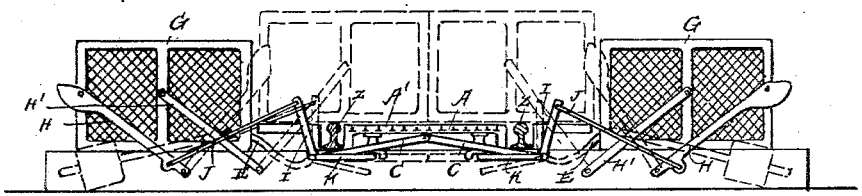
Figure 8:
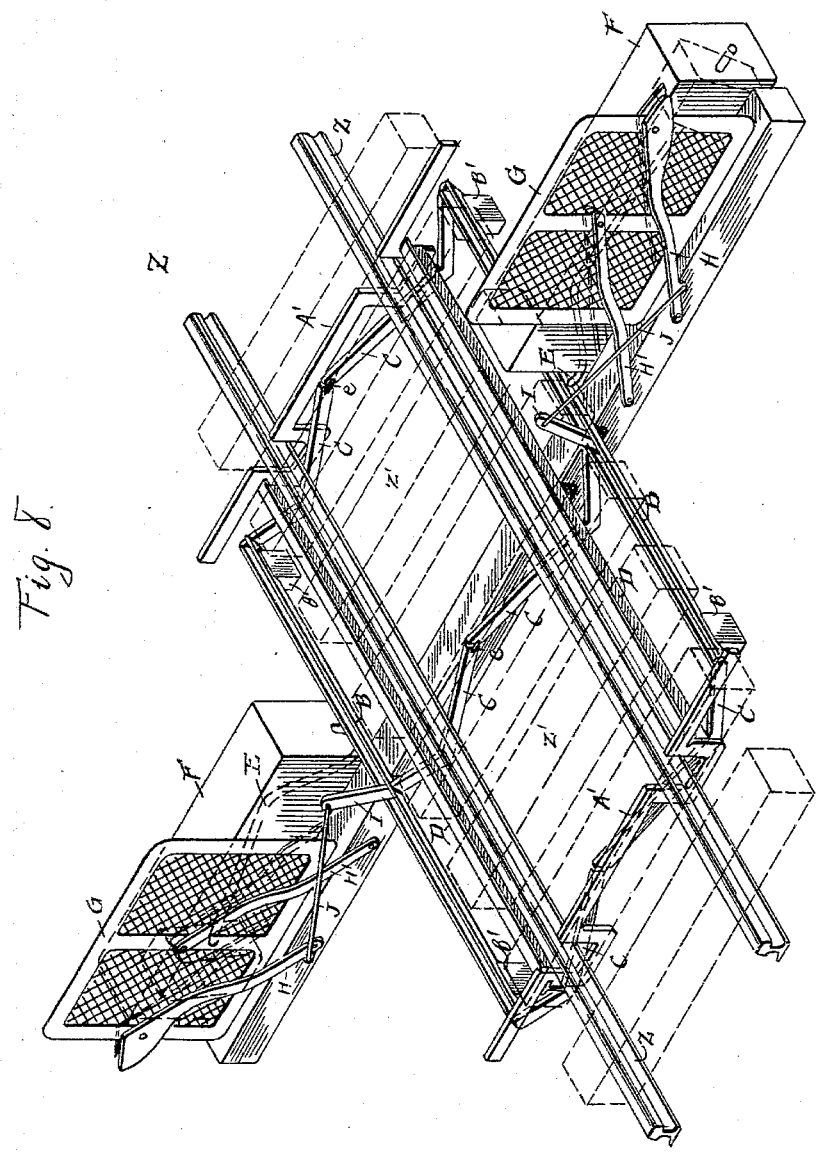

Figure 1 of the drawings is a plan view of the guard with the gates open, a portion of the surface guard only being shown. Fig. 2 is a section on line $x$ $x$, Fig. 1. Fig. 3 is a similar view taken with the gates closed. Fig. 4 is a plan view of a modified form of the guard, the gates being open and parts broken. Fig. 5 is a section of same on line $y$ $y$, Fig. 4. Fig. 6 is a sectional view illustrating the invention as adapted for a double track. Fig. 7 is a perspective view of the invention, the surface guard being partly broken away. Fig. 8 is a perspective view showing the invention applied with the platform removed to show the operating mechanism and the rail-ties indicated in dotted lines.

This invention is designed to provide efficient means for preventing cattle and other stock from passing on railroad-tracks by an automatic guard wherein a surface guard of any well-known or suitable character is combined with normally open parallel-motion gates in such a manner that the weight of an animal as it steps upon the guard causes the gates to close across the track and effectually prevent further passage, the gates being further arranged to return to their normally open position as soon as the animal steps from the guard.

The invention also provides mechanism of the character above indicated which is simple and not liable to get out of order, which is not rendered inoperative by ordinary falls of snow or by ice, and which can be put in place without disturbing the surface of the road-bed or track.

With these objects in view the invention consists in the novel construction and combination of parts, all substantially as hereinafter described, and pointed out in the appended claims.

Referring to the accompanying drawings, the letter Z designates a section of a railway-track, $z$ being the rails thereof, and $z'$ the cross-ties.

A designates a surface cattle-guard composed of a series of parallel longitudinal bars suitably connected to each other to form an open-work platform, which extends not only between the rails $z$, but also to the sides thereof, in the usual manner. The essential difference between this guard-platform and those commonly used is that it is supported in such a manner, as will presently be described, that it is capable of a direct up-and-down movement. To this end the cross or connecting bars A′ of the guard are either cut away at the upper edge to pass the rail $z$ or are bent down under the rails sufficiently to permit the necessary vertical play of the guard-platform.

At each side of the platform is a longitudinal rock-bar B, which is movably supported in suitable bearings. It may be on the end portions of the cross-ties $z'$, extended for that purpose, or upon supports B′, as shown in the drawings, Figs. 2, 3, 6, and 7. These bars, which may be of any suitable character, are shown in Figs. 1, 2, 3, 5, 6, and 7 as consisting of pieces of angle-iron of V shape in cross-section, and resting on thin sharp edges upon the bearings B. In this arrangement it will be seen that said bars have a sort of "knife-edge" bearing, with very little friction. Rigidly secured to each end of each of the said rock-bars is a lever C, of angular or bent form. The inner ends of the two levers at each end of the guard approximate each other, and are loosely connected by loose links $e$, or it may be by a loose pivot.

Extending longitudinally of the guard-platform and depending therefrom are two parallel rods or bars D, whose end portions rest in the angles of the said levers C, and thereby support the platform. In lieu of the rods or bars D the platform obviously may have suitable depending legs or lugs, which rest upon said levers.

It will be seen that inasmuch as the rock-bars B are connected to the outer end portions of the levers C, while the weight of the platform is at the angles thereof, when said platform is depressed said bars will be rocked inwardly for the purpose which will presently appear. In the drawings I have shown a third pair of the levers C at the center of the guard, but these may be dispensed with without affecting materially the operation.

Connected to each of the rock-bars is a laterally-extended weighted arm E, the weight of these arms being sufficient to retain the said bars, with the guard-platform, in normal position. These weighted arms preferably work in suitable boxing, as indicated at F, in order to protect them against any interference.

G G designate two parallel-motion gates, one at each side of the track, which are supported by means of pivoted parallel links or levers H H'. Connecting the outer links or levers of each of the gates with an arm I of the rock-bar B at that side of the track is a link-arm J.

It will be readily seen from the foregoing that whenever an animal steps upon the guard-platform its weight will overcome the action of the weighted arms E, and will depress the platform, causing the bar B to rock in the manner above described, whereby through the links I and the links or levers H H' the gates will be thrown across the track. The two gates are arranged to meet or nearly meet at the center of the track. The platform is preferably so nearly counterbalanced that the weight of a small animal will be sufficient to operate the gates. It will also be noted that owing to the parallel motion of the gates, whereby they rise as they are thrown across the track, they will not be interfered with by any ordinary fall of snow, since they will rise directly out of it. In other words, it is not possible for snow to offer any great resistance to their operation. This is also true of the platform, since its motion is directly up and down. In sections of the country where there is little snow or none a solid platform may be used. An open-work platform is in some respects, however, preferable in any case, since it will deter to a large extent stock from stepping thereon at all. I do not, however, limit myself to the use of any particular platform, and it is obvious that it may be of any suitable construction.

It will be noted that the gates when open guard the approaches to the sides of the track, thereby saving the expense of building the wing-fences close up to the track, as is usually necessary.

In Fig. 4 I have shown another arrangement of the rock-bars. In this case they are each formed with a series of cranks K, upon which the platform is supported, said cranks being normally in a horizontal plane. In this arrangement but one pair of the levers C (that at the center) is required.

It will be noted that, owing to the fact that the supports for the platform in both of the arrangements described are well out toward its lateral edges, it will not tilt should an animal step upon the end, the side, or the corner portions thereof.

The track-rails z should preferably not rest upon the cross-beams or other supports to which the gates are pivoted, in order that the gates and their operating mechanism may not be affected by the jar of passing trains. It is also advantageous for this reason to form the bearing for the rock-bars entirely independent of the ties. In this way not only will a great deal of noise be prevented, but the operative parts of the guard will be saved much jar and wear. The links or levers H H', which support the gates, are spread considerably apart at their lower end portions, whereby they form rigid braces for the gates in both open and closed positions, whereby they are enabled to withstand the efforts of the stock to push through them when closed or the pressure of the wind when open.

I have shown the guard as of the double form, that is to say, as having the platform extended to both sides of the gate, in order to guard approach from both directions. In many cases, however, as where the track is fenced, the single form is all that is necessary. In such cases the platform is made only about one-half the length which it has in the double form, and the gates are at one end instead of at the center. Otherwise the construction and operation are the same as above described.

Fig. 6 shows the application of the invention to a double-track road. Each track is provided with its own guard-platform, arranged as described, the two platforms being entirely independent of each other; but two gates are employed, however, one for each track, each gate being of sufficient length to close entirely across the adjacent track. Between the two tracks, the length of the guards, is placed a barrier or fence, such, for instance, as indicated at P, for the purpose of preventing stock from passing along between the two guards.

Having thus described my invention, what I claim as new, and desire to secure by Letters Patent, is—

1. The combination with a surface cattle-guard constructed to form a vertically-movable, non-tilting platform, of a pair of rock bars or shafts having arms or levers connected thereto and upon which the said platform is supported, a pair of normally open, parallel-motion gates, one of which is operatively connected with each of the said rock bars or shafts, together with weights arranged to hold said platform in its normal raised position. with the gates open, substantially as specified.

2. The combination with a surface cattle-guard construced to form a vertically-movable platform, of the two rock-shafts, one of which is situated underneath each lateral portion of said platform, said shafts having arms or levers upon which the platform rests.

the two gates normally open supported by parallel links or levers, and adapted to close across the track with parallel movement, and connections between the said rock bars or shafts and the said links or levers, together with weights which act upon said rock bars or shafts to hold the platform in its normal raised position and the gates open, substantially as specified.

3. The combination with a surface cattle guard or platform, constructed to form a vertically-movable, non-tilting platform, of the parallel counterweighted rock-bars, one of which is placed underneath each lateral portion of said platform, and which consist each of a bar having a sharp or pivot edge which rests upon suitable bearings, the bent arms or angular levers attached to each of said bars and arranged to support the platform, the normally open, parallel-motion gates, the parallel supporting brace-links for said gates, and operative connections between the said links and the said rock-bars, substantially as specified.

4. The combination with a surface cattle guard or platform, constructed to form a vertically-movable platform, of a pair of rock bars or shafts having arms upon which the said platform is supported, a parallel-motion gate, its pivoted supporting links or levers, and a connection between said gate and one of the said bars, whereby, as the said platform is depressed and the rock-bars are moved, said gate will be moved across the track, together with a weight adapted to return the platform and gate to normal position after operation, substantially as specified.

In testimony whereof I affix my signature in presence of two witnesses.

J. WALTER WINGET.

Witnesses:
GEORGE H. PARMELEE,
PHILIP C. MASI.